US012761709B2

(12) United States Patent
San

(10) Patent No.: US 12,761,709 B2
(45) Date of Patent: Oct. 13, 2026

(54) MONITOR RISER WITH DOCKING STATION

(71) Applicant: Cooler Master Technology Inc., Taipei City (TW)

(72) Inventor: Soong Hui San, Taipei City (TW)

(73) Assignee: Cooler Master Technology Inc., Taipei City (TW)

( * ) Notice: Subject to any disclaimer, the term of this patent is extended or adjusted under 35 U.S.C. 154(b) by 147 days.

(21) Appl. No.: 19/017,415

(22) Filed: Jan. 10, 2025

(65) Prior Publication Data

US 2025/0224782 A1 Jul. 10, 2025

(30) Foreign Application Priority Data

Jan. 10, 2024 (TW) ................................ 113200338

(51) Int. Cl.
*G06F 1/18* (2026.01)
*G06F 3/02* (2006.01)
*G06F 3/03* (2006.01)
*G06F 3/0354* (2013.01)

(52) U.S. Cl.
CPC ............ *G06F 1/189* (2013.01); *G06F 3/0202* (2013.01); *G06F 3/03543* (2013.01)

(58) Field of Classification Search
CPC ..... G06F 1/189; G06F 3/0202; G06F 3/03543
See application file for complete search history.

(56) References Cited

U.S. PATENT DOCUMENTS

| | | | | |
|---|---|---|---|---|
| 8,271,704 | B2 * | 9/2012 | Batish | G06F 3/023 710/62 |
| 8,519,960 | B2 * | 8/2013 | Chu | G06F 3/023 345/173 |
| 8,627,219 | B2 * | 1/2014 | Wang | H05K 7/1498 715/764 |
| 2009/0094395 | A1 * | 4/2009 | Shen | G06F 3/023 710/74 |
| 2009/0144568 | A1 * | 6/2009 | Fung | G06F 1/324 713/300 |
| 2014/0068119 | A1 * | 3/2014 | del Toro | G06F 3/038 710/72 |
| 2022/0326900 | A1 * | 10/2022 | Yabui | G06F 3/1423 |

* cited by examiner

*Primary Examiner* — Henry Tsai
*Assistant Examiner* — Harry Z Wang
(74) *Attorney, Agent, or Firm* — Merchant & Gould P.C.

(57) ABSTRACT

A monitor riser may include a casing and KVM switch. The casing includes an internal space and supports a monitor. The KVM switch is disposed in the internal space and includes a KVM unit, I/O unit, first port, second port, HMI unit, and expansion unit having a speaker. The KVM unit is electrically coupled to the first port and second port, HMI unit, I/O unit, and expansion unit. A keyboard, monitor and mouse is electrically coupled to the I/O unit. The HMI unit detects a touch input and generates a first signal and second signal. The KVM unit receives the first signal and electrically couples a first computing device electrically coupled to the first port to the keyboard, monitor, mouse, and speaker, and receives the second signal and electrically couples a second computing device electrically coupled to the second port to the keyboard, monitor, mouse, and speaker.

17 Claims, 7 Drawing Sheets

MONITOR RISER WITH DOCKING STATION

RELATED APPLICATIONS

This US application claims the benefit of priority to Taiwan application no. 113200338, filed on Jan. 10, 2024, of which is incorporated herein by reference in its entirety.

TECHNICAL FIELD

The present disclosure is related to monitor risers of electronic devices in general and more particularly but not limited to monitor risers with docking stations.

BACKGROUND OF THE INVENTION

For some, a cluttered computer desktop may be a visual distraction that interferes with focus and productivity. Multiple USBs, monitors, and power cables, may decrease surface space for equipment and reference materials.

Monitor risers raise monitor screens to a preferred viewing height and add space underneath for storage of power cables, keyboards, notebooks, and papers. Internal computer, monitor, or laptop speakers reduce clutter by eliminating the need for external speakers and cords and cables. Wireless phone chargers also eliminate the need for cords and cables. KVM switch docking stations allow users to switch between multiple PCs or servers from a single set of peripheral devices (keyboard, monitor, and mouse) for efficiency, management, and cost and space savings. However, all of the foregoing may be standalone apparatuses or devices. Thus, while cords and cables may be eliminated or neatly tucked away, space for the wireless phone charger or the KVM switch docking station is still required. Also, internal speakers are often not designed for playing music and video audio, thus, sound quality may be sacrificed.

SUMMARY OF THE INVENTION

The present disclosure provides a device for raising a monitor screen to a desired viewing level, increasing space for storage, and switching between multiple PCs or servers from a single set of peripheral devices, eliminating need for cords and cables.

In some aspects, the techniques described herein relate to a monitor riser to support a monitor, including a casing and a keyboard, video and mouse switch (KVM switch). The casing includes an internal space and is configured to enable the monitor to be supported thereon. The KVM switch is disposed in the internal space and includes a KVM unit, an input-output device interface unit (I/O unit), a first port, a second port, a human-machine interface unit (HMI unit), and an expansion unit. The expansion unit includes one or more speakers electrically coupled thereto. The KVM unit is respectively electrical coupled to the first port and the second port, and to the HMI unit, and to the I/O unit, and to the expansion unit. The I/O unit is configured to enable a keyboard, the monitor and a mouse to be respectively electrically coupled to the I/O unit. The HMI unit is configured to detect a touch input from a user's finger or a stylus and generate an electrical command signal. The electrical command signal includes a first switching command signal and a second switching command signal. The KVM unit is configured to receive the first switching command signal from the HMI unit and electrical couple a first computing device electrically coupled to the first port to the keyboard, the monitor, the mouse, and the one or more speakers. The KVM unit is configured to receive the second switching command signal from the HMI unit and electrical couple a second computing device electrically coupled to the second port to the keyboard, the monitor, the mouse, and the one or more speakers.

In some aspects, the techniques described herein relate to a monitor riser, wherein the casing further includes a top panel, a bottom panel, a front panel, a back panel, a first side panel, and a second side panel. The top panel, the bottom panel, the front panel, the back panel, the first side panel, and the second side panel, together, form a cuboid shape having the bottom panel opposite the top panel, the back panel opposite the front panel, and the second side panel opposite the first side panel. The monitor is supported on the top panel, and the top panel, the bottom panel, the front panel, the back panel, the first side panel, and the second side panel, together, define the internal space.

In some aspects, the techniques described herein relate to a monitor riser, wherein the I/O unit includes a keyboard port, a display port and a mouse port. The keyboard port, the display port and the mouse port are respectively disposed at the back panel. The keyboard, the monitor and the mouse are respectively electrically coupled to the I/O unit via the keyboard port, the display port, and the mouse port.

In some aspects, the techniques described herein relate to a monitor riser, wherein the first port and the second port are respectively disposed at the back panel.

In some aspects, the techniques described herein relate to a monitor riser, wherein the expansion unit further includes a hard drive electrically coupled thereto. The hard drive is disposed in the internal space. The KVM unit is further configured to receive the first switching command signal from the HMI unit and electrical couple the first computing device to the hard drive. The KVM unit is further configured to receive the second switching command signal from the HMI unit and electrical couple the second computing device to the hard drive.

In some aspects, the techniques described herein relate to a monitor riser, wherein the expansion unit further includes an audio port, a USB port, an internet port, and an SD card slot. The audio port and the USB port are respectively disposed at the first side panel and the internet port is disposed at the back panel. A headphone, a peripheral device, a router and an SD card are respectively electrically coupled to the expansion unit via the audio port, the USB port, the internet port, and the SD card slot. The KVM unit is further configured to receive the first switching command signal from the HMI unit and electrical couple the first computing device to the headphone, the peripheral device, the router and the SD card. The KVM unit is further configured to receive the second switching command signal from the HMI unit and electrical couple the second computing device to the headphone, the peripheral device, the router and the SD card.

In some aspects, the techniques described herein relate to a monitor riser, wherein the HMI unit includes a processor and a touchscreen, and wherein the front panel includes a first grill portion and a second grill portion. The touchscreen is disposed between the first grill portion and the second grill portion and is electrically coupled to the HMI unit via the processor. The touchscreen is configured to detect the touch input from the user's finger or the stylus. The first grill portion and the second grill portion, both, respectively are configured to enable sound to travel therethrough. In some aspects, the techniques described herein relate to a monitor riser, wherein the one or more speakers include two one or more speakers. Each of the two one or more speakers is respectively disposed in the internal space at the first grill portion and the second grill portion.

In some aspects, the techniques described herein relate to a monitor riser, further including a power port, a power conversion unit, and one or more power sockets. The power port and the one or more power sockets are respectively disposed at the back panel and the power conversion unit is disposed in the internal space. The power port is respectively electrically coupled to the power conversion unit and the one or more power sockets. The power port is configured to enable the monitor riser to use a power sent from a facility power outlet to the power conversion unit through a power cable to operate the monitor riser. The power port is configured to enable an electronic device to use the power sent by one or more power cables respectively electrically coupled to the one or more power sockets to charge a battery or operate the electronic device. In some aspects, the techniques described herein relate to a monitor riser, wherein the one or more power sockets include four one or more power sockets.

In some aspects, the techniques described herein relate to a monitor riser, wherein the top panel includes a wireless charging station. The wireless charging station is electrically coupled to the power conversion unit. The wireless charging station is configured to enable the electronic device to use the power sent by the wireless charging station to charge the battery of the electronic device or operate the electronic device.

In some aspects, the techniques described herein relate to a monitor riser, further including a first bracket and a second bracket. The first bracket and the second bracket, both, are configured to enable a bottom space to be formed opposite the internal space of the bottom panel. The first bracket is disposed at the first side panel and the second bracket is disposed at the second side panel.

In some aspects, the techniques described herein relate to a monitor riser, wherein the first port includes an audio-visual signal port and a control signal port and the second port includes a USB-C port. The audio-visual signal port and the control signal port are configured to enable a desktop computing device to be electrically coupled thereto via an audio-visual cable and a control cable. The USB-C port is configured to enable a laptop computing device to be electrically coupled thereto via a USB-C cable.

In some aspects, the techniques described herein relate to a monitor riser, wherein the KVM switch further includes a third port, and wherein the electrical command signal further includes a third switching command signal. The third port is disposed at the back panel and the KVM unit is electrical coupled to the third port. The KVM unit is configured to receive the third switching command signal from the HMI unit and electrical couple a third computing device electrically coupled to the third port to the keyboard, the monitor, the mouse, and the one or more speakers. In some aspects, the techniques described herein relate to a monitor riser, wherein the third port includes an HDMI port. The HDMI port is configured to enable a gaming console or gaming computing device to be electrically coupled thereto via an HDMI cable.

In some aspects, the techniques described herein relate to a monitor riser, wherein the KVM unit is further configured to receive the third switching command signal from the HMI unit and electrical couple the third computing device to the hard drive. In some aspects, the techniques described herein relate to a monitor riser, wherein the KVM unit is further configured to receive the third switching command signal from the HMI unit and electrical couple the third computing device to the headphone, the peripheral device, the router and the SD card.

BRIEF DESCRIPTION OF DRAWINGS

Unless specified otherwise, the accompanying drawings illustrate aspects of the innovative subject matter described herein. Referring to the drawings, wherein like reference numerals indicate similar parts throughout the several views, several examples of monitor risers with docking stations incorporating aspects of the presently disclosed principles are illustrated by way of example, and not by way of limitation.

DETAILED DESCRIPTION

The following describes various principles related to monitor risers with docking stations by way of reference to specific examples of casings and KVM switches, including specific arrangements and examples of electrical coupling of keyboards, monitors, mice, speakers, hard drives, headphones, peripheral devices, routers and SD cards embodying innovative concepts. More particularly, but not exclusively, such innovative principles are described in relation to selected examples of KVM units, I/O units, HMI units, and expansion units, and well-known functions or constructions are not described in detail for purposes of succinctness and clarity. Nonetheless, of the disclosed principles can be incorporated in various other embodiments of different KVM units, I/O units, HMI units, and expansion units to achieve any of a variety of desired outcomes, characteristics, and/or performance criteria.

Thus, KVM units, I/O units, HMI units, and expansion units having attributes that are different from those specific examples discussed herein can embody of the innovative principles, and can be used in applications not described herein in detail. Accordingly, embodiments of KVM units, I/O units, HMI units, and expansion units not described herein in detail also fall within the scope of this disclosure, as will be appreciated by those of ordinary skill in the relevant art following a review of this disclosure.

Example embodiments as disclosed herein are directed to monitor risers with docketing stations for computing devices, as examples, laptop computers, desktop computers, and servers, in home offices, small businesses, computer rooms, server rooms, data centers, control rooms, and manufacturing facilities. A monitor riser includes space underneath for storage of power cables, keyboards, notebooks, and papers, as examples. A KVM switch can include KVM units, I/O units, HMI units, and expansion units, enabling a single user to operate multiple computing devices from a single set of peripheral devices.

Figure 1A:
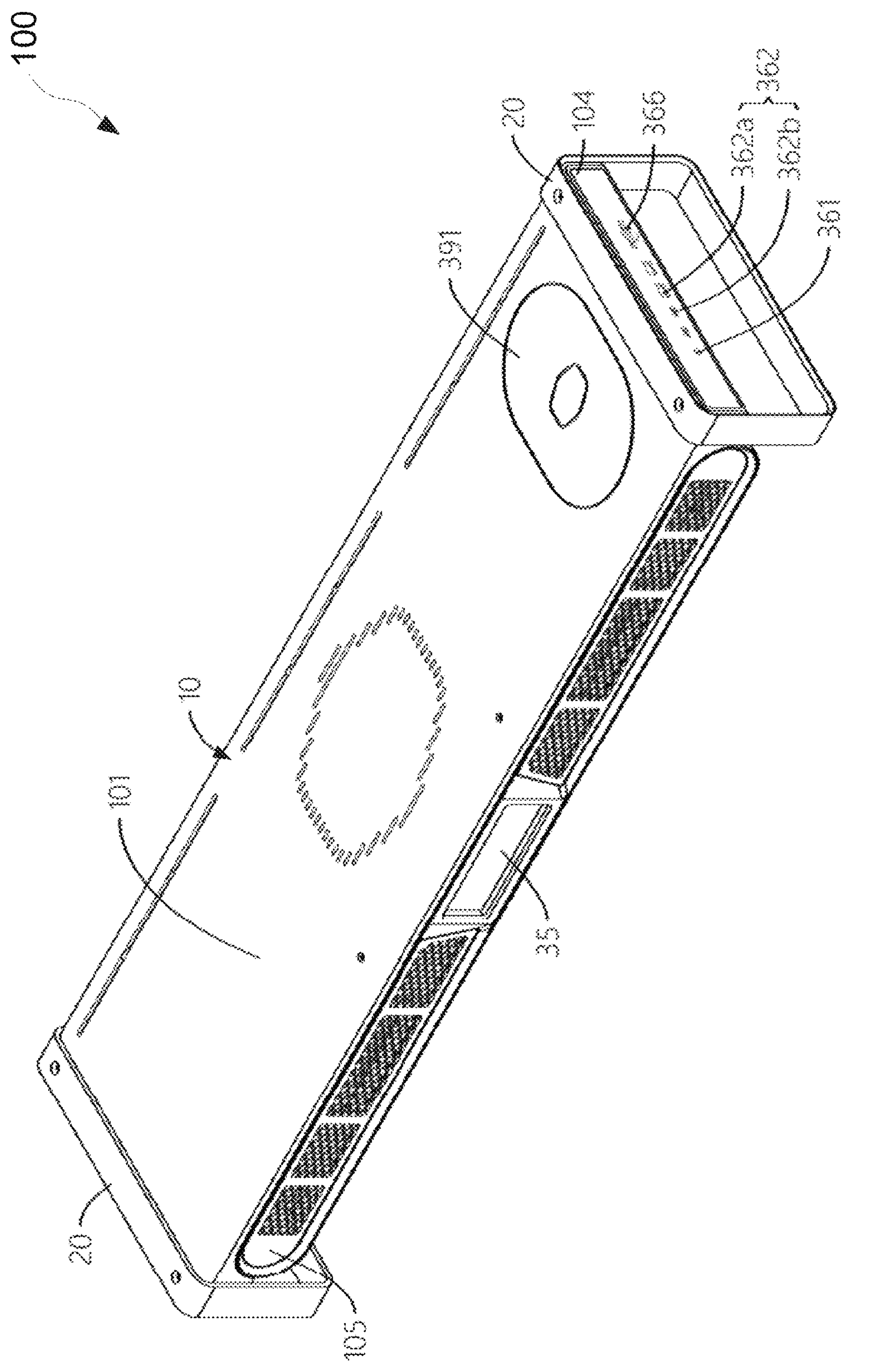
FIG. 1A illustrates a monitor riser according to one embodiment of the present disclosure.
Figure 1B:
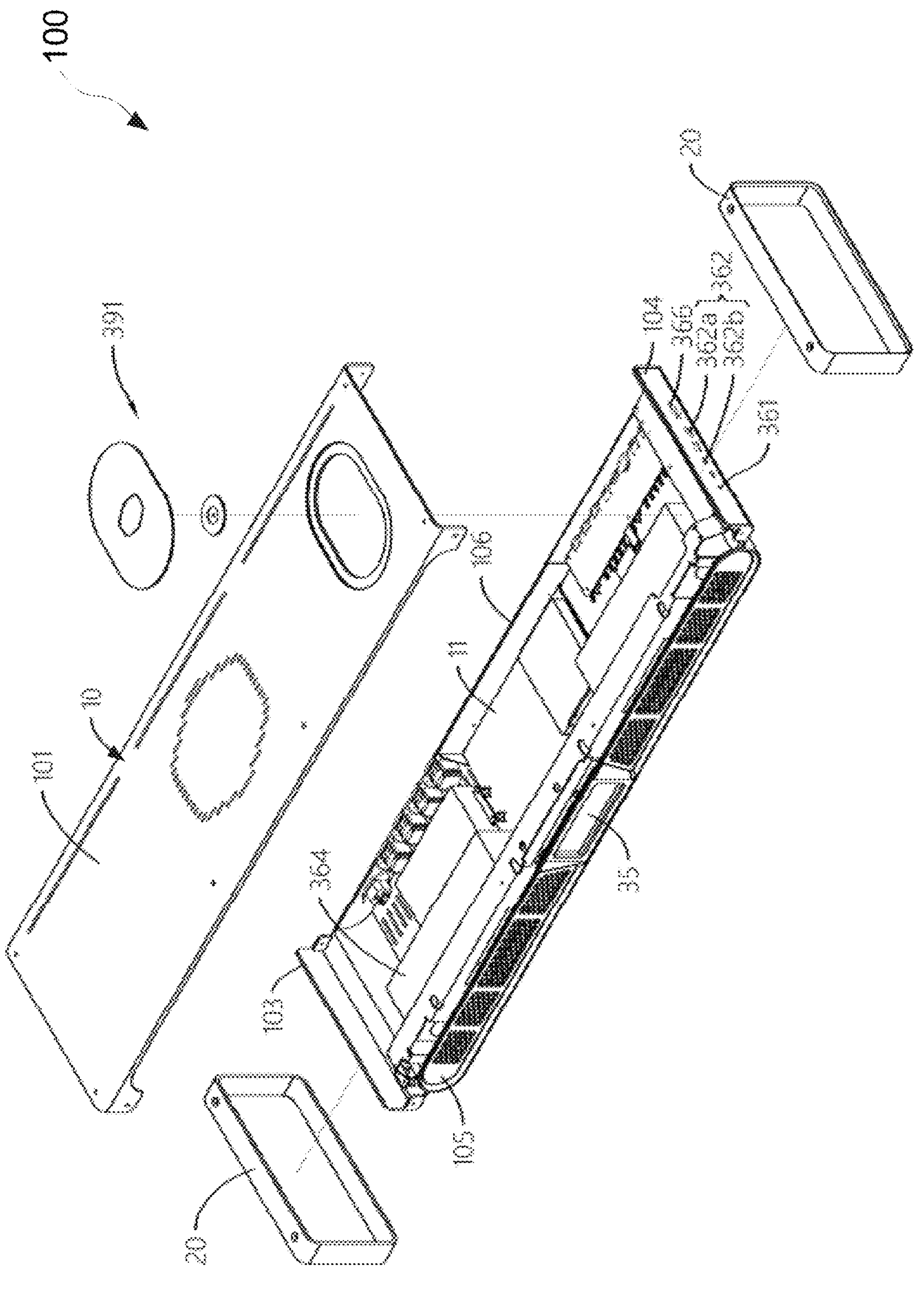
FIG. 1B is a partially exploded view of the monitor riser of FIG. 1A, according to one embodiment of the present disclosure.
Figure 1C:
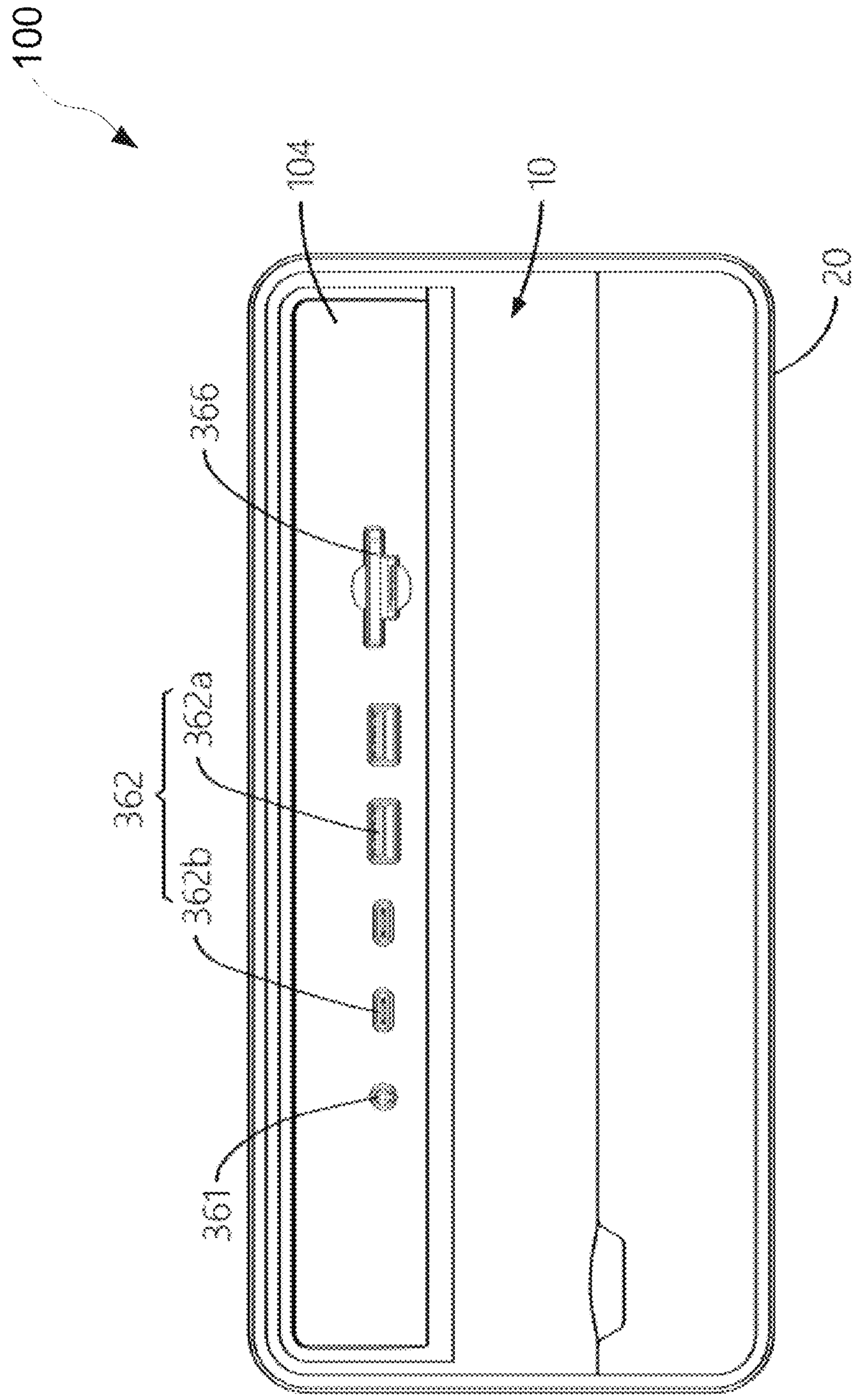
FIG. 1C illustrates a sideview of the monitor riser of FIG. 1A, according to one embodiment of the present disclosure.
Figure 2:
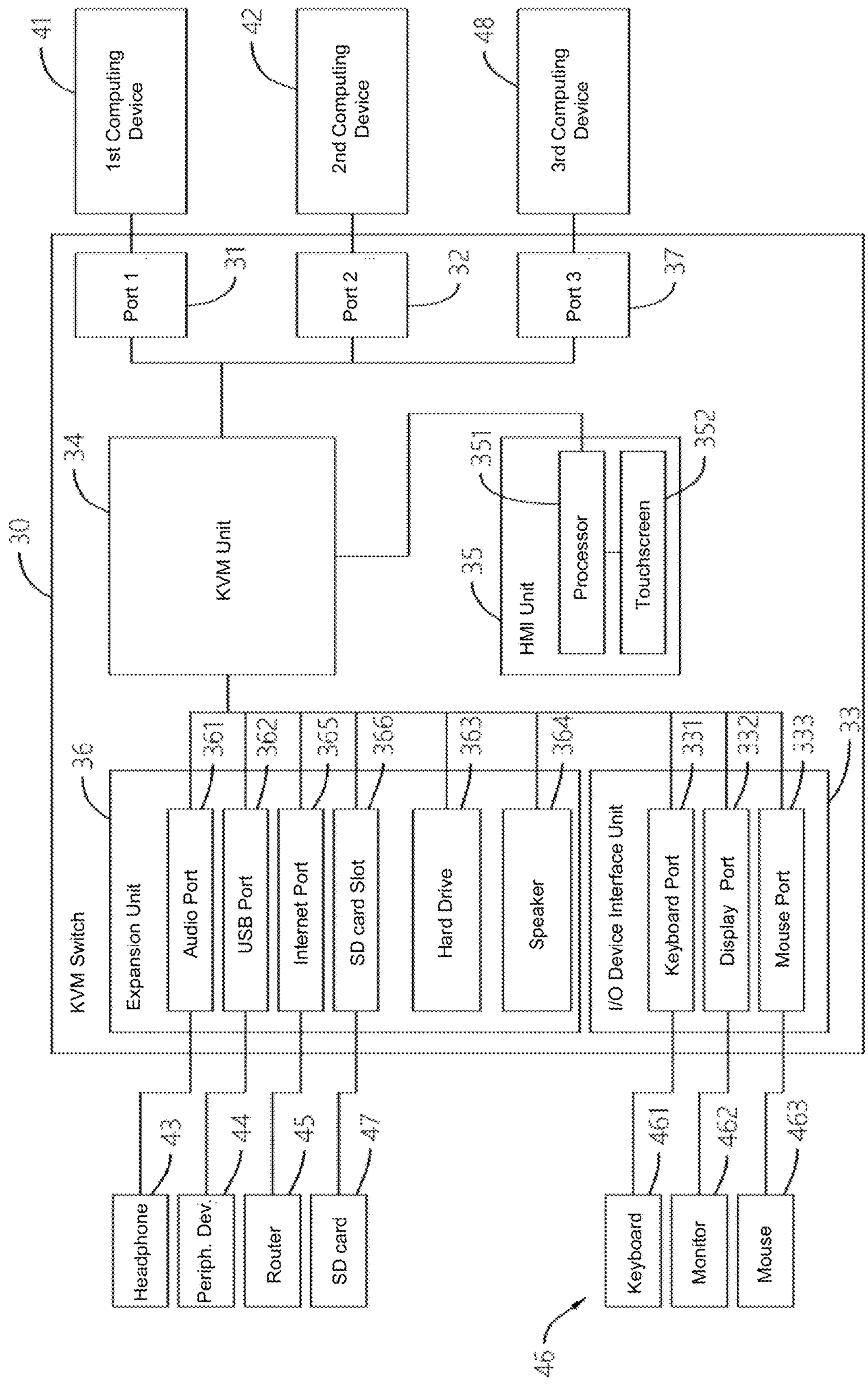
FIG. 2 is a block diagram of the monitor riser of FIG. 1A, according to one embodiment of the present disclosure.
Figure 3A:
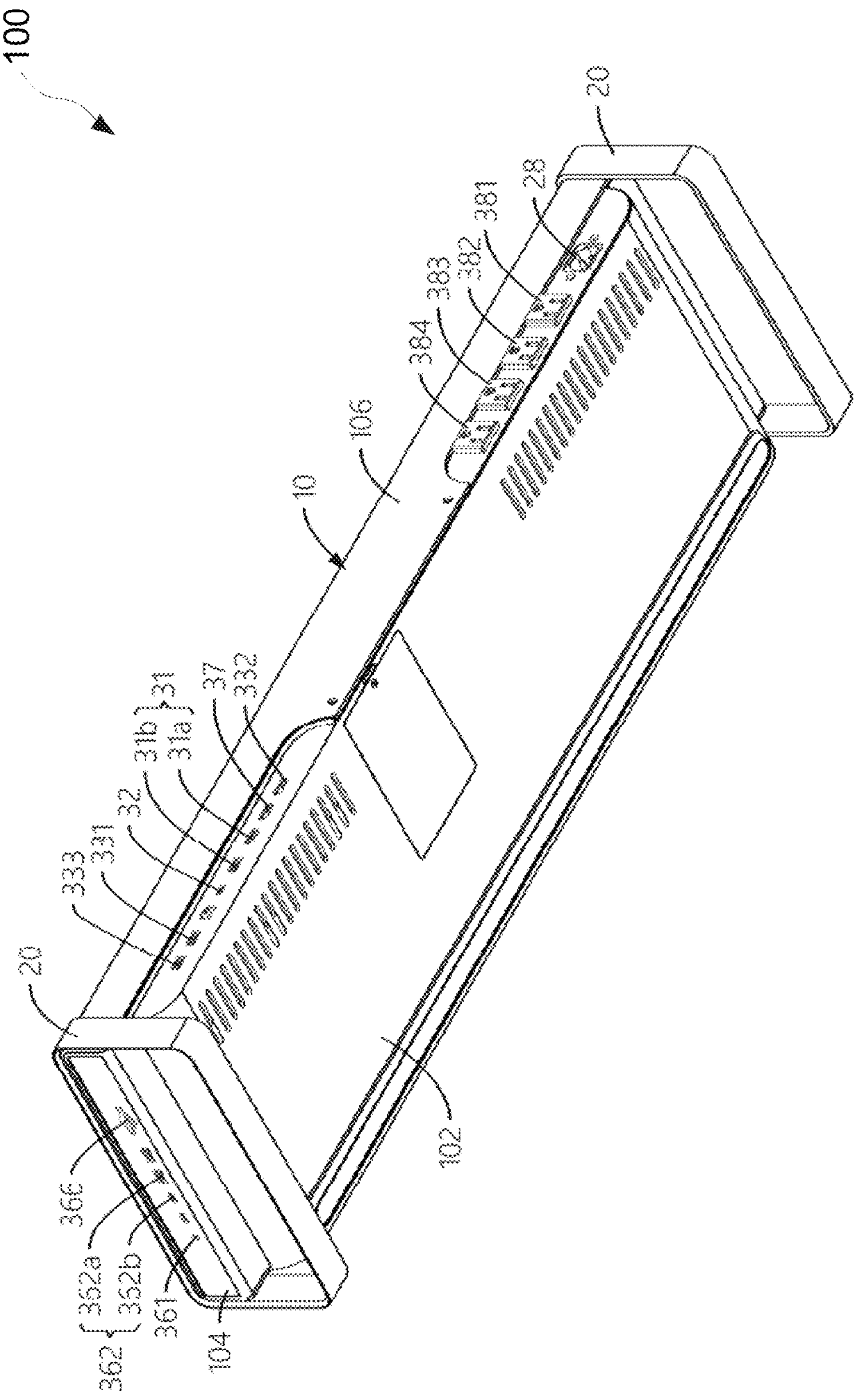
FIG. 3A illustrates an angled bottom view of the monitor riser of FIG. 1A, according to one embodiment of the present disclosure.
Figure 3B:
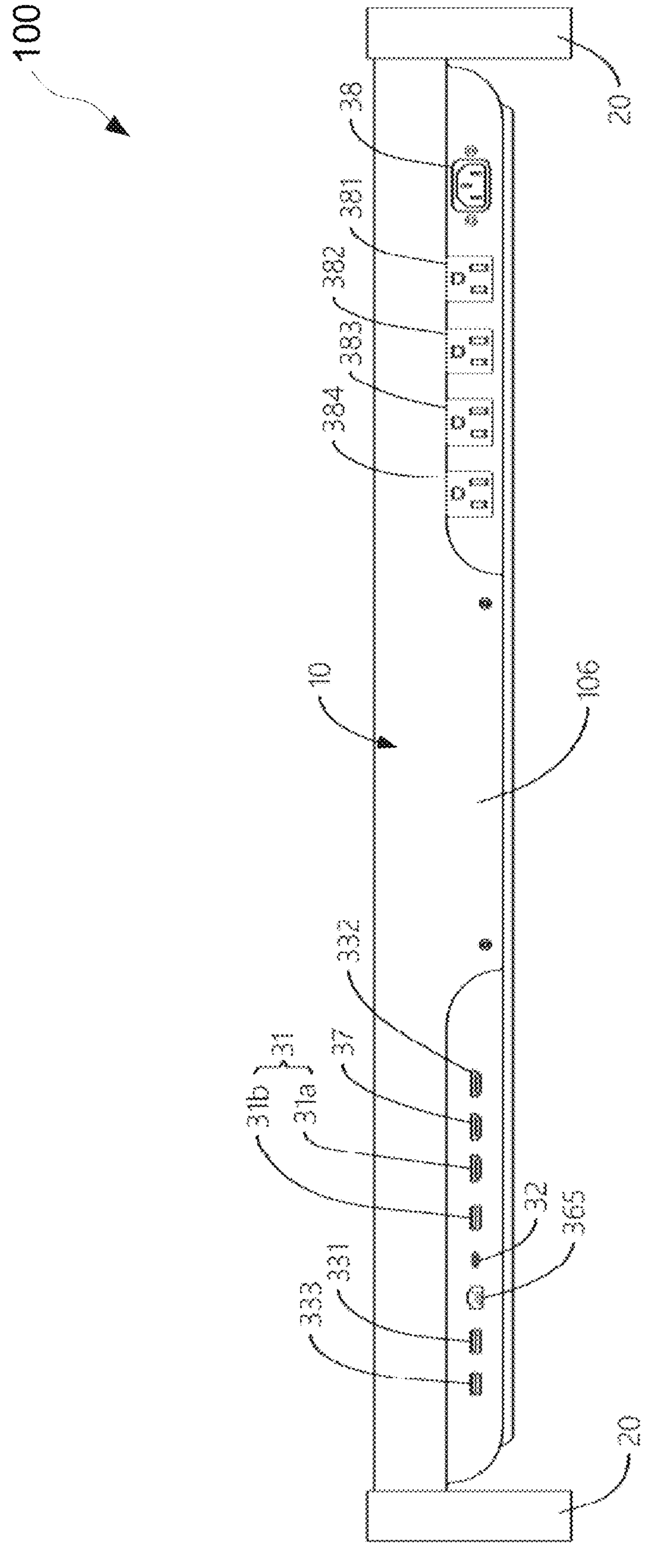
FIG. 3B illustrates a back view of the monitor riser of FIG. 1A, according to one embodiment of the present disclosure.
Figure 4:
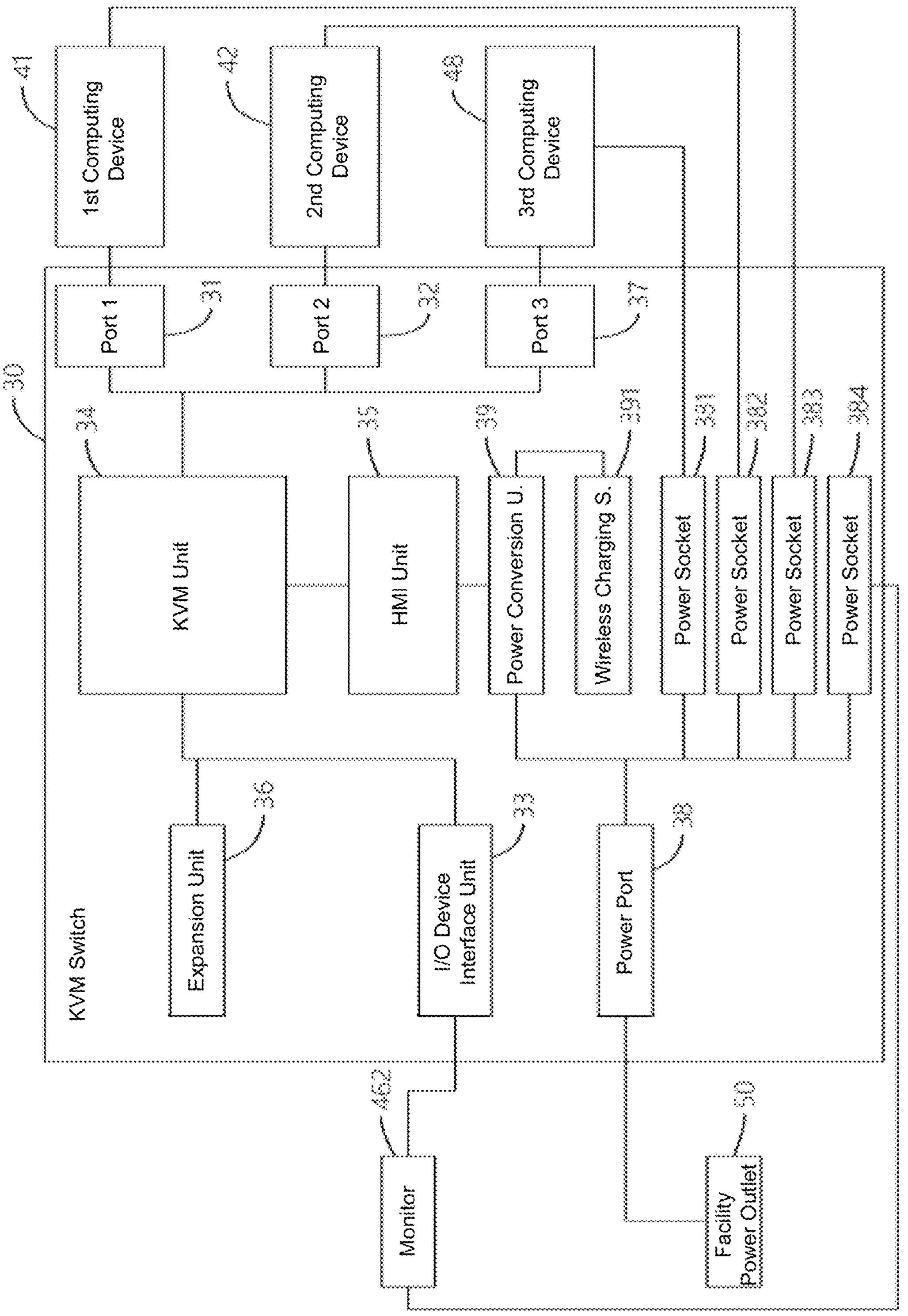
FIG. 4 is another block diagram of the monitor riser of FIG. 1A, according to one embodiment of the present disclosure.

FIGS. 1A, 1B, 1C, 2, 3A, 3B, and 4 include at least one embodiment of a monitor riser 100 to support a monitor 462. The monitor riser 100 includes a casing 10 and a keyboard, video and mouse switch (KVM switch 30). The casing 10 includes an internal space 11 and is configured to enable the monitor 462 to be supported thereon. The KVM switch 30 is disposed in the internal space 11 and includes a KVM Unit 34, an input-output device interface unit (I/O unit 33), a first port, a second port 32, a human-machine interface unit (HMI Unit 35), and an expansion unit. The expansion unit includes one or more speakers 364 electrically coupled thereto. The KVM Unit 34 is respectively electrical coupled to the first port and the second port 32, and to the HMI Unit 35, and to the I/O unit 33, and to the expansion unit. The I/O unit 33 is configured to enable a keyboard, the monitor 462 and a mouse to be respectively electrically coupled to the I/O unit 33. The HMI Unit 35 is configured to detect a touch input from a user's finger or a stylus and generate an electrical command signal. The electrical command signal includes a first switching command signal and a second switching command signal. The KVM Unit 34 is configured to receive the first switching command signal from the HMI Unit 35 and electrical couple a first computing device 41 electrically coupled to the first port to the keyboard, the monitor 462, the mouse, and the one or more speakers 364. The KVM Unit 34 is configured to receive the second switching command signal from the HMI Unit 35 and electrical couple a second computing device 42 electrically coupled to the second port 32 to the keyboard, the monitor 462, the mouse, and the one or more speakers 364.

In some embodiments, the casing 10 further includes a top panel 101, a bottom panel 102, a front panel 105, a back panel 106, a first side panel 104, and a second side panel 103. The top panel 101, the bottom panel 102, the front panel 105, the back panel 106, the first side panel 104, and the second side panel 103, together, form a cuboid shape having the bottom panel 102 opposite the top panel 101, the back panel 106 opposite the front panel 105, and the second side panel 103 opposite the first side panel 104. The monitor 462 is supported on the top panel 101, and the top panel 101, the bottom panel 102, the front panel 105, the back panel 106, the first side panel 104, and the second side panel 103, together, define the internal space 11.

In some embodiments, the I/O unit 33 includes a keyboard port 331, a display port and a mouse port 333. The keyboard port 331, the display port and the mouse port 333 are respectively disposed at the back panel 106. The keyboard, the monitor 462 and the mouse are respectively electrically coupled to the I/O unit 33 via the keyboard port 331, the display port, and the mouse port 333. In some embodiments, the keyboard port 331 includes a USB-A port, the display port includes an HDMI port and the mouse port 333 includes a USB-A port.

In some embodiments, the first port and the second port 32 are respectively disposed at the back panel 106.

In some embodiments, the expansion unit further includes a hard drive 363 electrically coupled thereto. The hard drive 363 is disposed in the internal space 11. The KVM Unit 34 is further configured to receive the first switching command signal from the HMI Unit 35 and electrical couple the first computing device 41 to the hard drive 363. The KVM Unit 34 is further configured to receive the second switching command signal from the HMI Unit 35 and electrical couple the second computing device 42 to the hard drive 363.

In some embodiments, the expansion unit further includes an audio port, a USB port, an internet port, and an SD card 47 slot. The audio port and the USB port are respectively disposed at the first side panel 104 and the internet port is disposed at the back panel 106. A headphone 43, a peripheral Device 44, a Router 45 and an SD card 47 are respectively electrically coupled to the expansion unit via the audio port, the USB port, the internet port, and the SD card 47 slot. The KVM Unit 34 is further configured to receive the first switching command signal from the HMI Unit 35 and electrical couple the first computing device 41 to the headphone 43, the peripheral Device 44, the Router 45 and the SD card. The KVM Unit 34 is further configured to receive the second switching command signal from the HMI Unit 35 and electrical couple the second computing device 42 to the headphone 43, the peripheral Device 44, the Router 45 and the SD card. In some embodiments, the audio port includes a 3.5-millimeter audio jack port or an HDMI port. In some embodiments, the USB port includes two USB-A ports, and two USB-C ports. In some embodiments, the USB-A ports are respectively a USB-A 5G with 7.5 W Power and a USB-A 10 Gbps with 7.5 W Power. In some embodiments, the USB-C ports are USB-C 10 Gbs with 30 W Power. In some embodiments, the peripheral Device 44 includes a USB flash drive, an external hard drive 363, a wireless keyboard and mouse receiver, and a wireless Bluetooth receiver. In some embodiments, the internet port is a registered jack-45 port (RJ45 port). In some embodiments, the hard drive 363 is a solid-state drive (SSD drive).

In some embodiments, the HMI Unit 35 includes a processor 351 and a touchscreen 352, and wherein the front panel 105 includes a first grill portion and a second grill portion. The touchscreen 352 is disposed between the first grill portion and the second grill portion and is electrically coupled to the HMI Unit 35 via the processor 351. The touchscreen 352 is configured to detect the touch input from the user's finger or the stylus. The first grill portion and the second grill portion, both, respectively are configured to enable sound to travel therethrough. In some embodiments, the one or more speakers 364 include two one or more speakers 364. Each of the two one or more speakers 364 is respectively disposed in the internal space 11 at the first grill portion and the second grill portion.

In some embodiments, the monitor riser 100 further includes a power port, a power conversion unit, and one or more power sockets. The power port and the one or more power sockets are respectively disposed at the back panel 106 and the power conversion unit is disposed in the internal space 11. The power port is respectively electrically coupled to the power conversion unit and the one or more power sockets. The power port is configured to enable the monitor riser 100 to use a power sent from a facility power outlet 50 to the power conversion unit through a power cable to operate the monitor riser 100. The power port is configured to enable an electronic device to use the power sent by one or more power cables respectively electrically coupled to the one or more power sockets to charge a battery or operate the electronic device. In some embodiments, the one or more power sockets include four one or more power sockets.

In some embodiments, the top panel 101 includes a wireless charging station 391. The wireless charging station 391 is electrically coupled to the power conversion unit. The wireless charging station 391 is configured to enable the electronic device to use the power sent by the wireless charging station 391 to charge the battery of the electronic device or operate the electronic device.

In some embodiments, the monitor riser 100 further includes a first bracket and a second bracket. The first bracket and the second bracket, both, are configured to enable a bottom space to be formed opposite the internal space 11 of the bottom panel 102. The first bracket is disposed at the first side panel 104 and the second bracket is disposed at the second side panel 103. In some embodiments, the first bracket and the second bracket can be rectangular-shaped legs respectively fastened to a top of the monitor riser 100 at the first side panel 104 and the second side panel 103.

In some embodiments, the first port includes an audio-visual signal port 31*a* and a control signal port 31*b* and the second port 32 includes a USB-C port. The audio-visual signal port 31*a* and the control signal port 31*b* are configured to enable a desktop computing device to be electrically coupled thereto via an audio-visual cable and a control cable. The USB-C port is configured to enable a laptop computing device to be electrically coupled thereto via a USB-C cable. In some embodiments, the USB-C port is a USB-C with 100 W port.

In some embodiments, the KVM switch 30 further includes a third port, and wherein the electrical command signal further includes a third switching command signal. The third port is disposed at the back panel 106 and the KVM Unit 34 is electrical coupled to the third port. The KVM Unit 34 is configured to receive the third switching command signal from the HMI Unit 35 and electrical couple a third computing device 48 electrically coupled to the third port to the keyboard, the monitor 462, the mouse, and the one or more speakers 364. In some embodiments, the third port includes an HDMI port. The HDMI port is configured to enable a gaming console or gaming computing device to be electrically coupled thereto via an HDMI cable.

In some embodiments, the KVM Unit 34 is further configured to receive the third switching command signal from the HMI Unit 35 and electrical couple the third computing device 48 to the hard drive 363. In some embodiments, the KVM Unit 34 is further configured to receive the third switching command signal from the HMI Unit 35 and electrical couple the third computing device 48 to the headphone 43, the peripheral Device 44, the Router 45 and the SD card.

In some embodiments, in addition to displaying a choice between operating the first computing device 41, the second computing device 42, and the third computing device 48, the touchscreen 352 displays weather information, a clock, a radio channel screen for choosing a radio station, a volume screen for adjusting a volume of the radio station and the like.

The monitor riser 100 of the embodiments described herein provide a single device for raising a monitor screen 462 to a desired viewing height and switching between multiple PCs or servers from a single set of peripheral devices, eliminating need for cords and cables. The first computing device 41, the second computing device 42, and the third computing device 48 can all be electrically coupled to the KVM switch 30, integrated within the casing 10, and via the touchscreen 352 a user can conveniently switch between operation of the first computing device 41, the second computing device 42, or the third computing device 48. The hard drive 363, headphone 43, peripheral devices, Router 45, and SD card 47 are all available for use by each of the first computing device 41, the second computing device 42, and the third computing device 48. The wireless charging station 391 eliminates the need for a standalone wireless charger. The two one or more speakers 364 are designed for playing music and video audio, thus, improving sound quality over internal speakers while eliminating the need for an external speaker system. Moreover, the KVM switch 30 operates in a Single Stream Transport mode (SST mode). Thus, multiple USB devices can be electrically coupled to the KVM switch 30 at a same time, while still achieving high data transfer rates. Cords and cables are eliminated or neatly tucked away, and space for the wireless phone charger or the KVM switch 30 docking station is not required. A device for raising a monitor screen 462 to a desired viewing level, increasing space for storage, and switching between multiple PCs or servers from a single set of peripheral devices, eliminating need for cords and cables, for efficiency, management, and cost and space savings, is provided.

Therefore, embodiments disclosed herein are well adapted to attain the ends and advantages mentioned as well as those that are inherent therein. The particular embodiments disclosed above are illustrative only, as the embodiments disclosed may be modified and practiced in different but equivalent manners apparent to those of ordinary skill in the relevant art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some number. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean than one of the element that it introduces.

The invention claimed is:

1. A monitor riser to support a monitor, comprising:

a casing including an internal space, the casing configured to enable the monitor to be supported thereon;

a keyboard, video and mouse switch, the keyboard, video and mouse switch disposed in the internal space, the keyboard, video and mouse switch includes a keyboard, video and mouse unit, an input-output device interface unit, a first port, a second port, a human-machine interface unit, and an expansion unit, the expansion unit comprises one or more speakers electrically coupled thereto, the keyboard, video and mouse unit respectively electrical coupled to the first port and the second port, and to the human-machine interface unit, and to the input-output device interface unit, and to the expansion unit, the input-output device interface unit configured to enable a keyboard, the monitor and a mouse to be respectively electrically coupled to the input-output device interface unit, the human-machine interface unit configured to detect a touch input from a user's finger or a stylus and generate an electrical command signal, the electrical command signal comprises a first switching command signal and a second switching command signal, the keyboard, video and mouse unit configured to receive the first switching command signal from the human-machine interface unit and electrical couple a first computing device electrically coupled to the first port to the keyboard, the monitor, the mouse, and the one or more speakers, the keyboard, video and mouse unit configured to receive the second switching command signal from the human-machine interface unit and electrical couple a second computing device electrically coupled to the second port to the keyboard, the monitor, the mouse, and the one or more speakers.

2. The monitor riser of claim 1, wherein the casing further comprises a top panel, a bottom panel, a front panel, a back panel, a first side panel, and a second side panel, and the top panel, the bottom panel, the front panel, the back panel, the first side panel, and the second side panel, together, form a cuboid shape having the bottom panel opposite the top panel, the back panel opposite the front panel, and the second side panel opposite the first side panel, and the monitor is supported on the top panel, and the top panel, the bottom panel, the front panel, the back panel, the first side panel, and the second side panel, together, define the internal space.

3. The monitor riser of claim 2, wherein the first port and the second port are respectively disposed at the back panel.

4. The monitor riser of claim 2, wherein the expansion unit further comprises a hard drive electrically coupled thereto, the hard drive disposed in the internal space, the keyboard, video and mouse unit further configured to receive the first switching command signal from the human-machine interface unit and electrical couple the first computing device to the hard drive, the keyboard, video and mouse unit further configured to receive the second switching command signal from the human-machine interface unit and electrical couple the second computing device to the hard drive.

5. The monitor riser of claim 4, wherein the expansion unit further comprises an audio port, a USB port, an internet port, and an SD card slot, the audio port and the USB port respectively disposed at the first side panel, the internet port disposed at the back panel, a headphone, a peripheral device, a router and an SD card are respectively electrically coupled to the expansion unit via the audio port, the USB port, the internet port, and the SD card slot, the keyboard, video and mouse unit further configured to receive the first switching command signal from the human-machine interface unit and electrical couple the first computing device to the headphone, the peripheral device, the router and the SD card, the keyboard, video and mouse unit further configured to receive the second switching command signal from the human-machine interface unit and electrical couple the second computing device to the headphone, the peripheral device, the router and the SD card.

6. The monitor riser of claim 2, wherein the human-machine interface unit comprises a processor and a touchscreen, and wherein the front panel comprises a first grill portion and a second grill portion, the touchscreen disposed between the first grill portion and the second grill portion, the touchscreen electrically coupled to the human-machine interface unit via the processor, the touchscreen configured to detect the touch input from the user's finger or the stylus, the first grill portion and the second grill portion, both, respectively configured to enable sound to travel therethrough.

7. The monitor riser of claim 6, wherein the one or more speakers comprise two one or more speakers, each of the two one or more speakers respectively disposed in the internal space at the first grill portion and the second grill portion.

8. The monitor riser of claim 2, further comprising a power port, a power conversion unit, and one or more power sockets, the power port and the one or more power sockets respectively disposed at the back panel, the power conversion unit disposed in the internal space, the power port respectively electrically coupled to the power conversion unit and the one or more power sockets, the power port configured to enable the monitor riser to use a power sent from a facility power outlet to the power conversion unit through a power cable to operate the monitor riser, and configured to enable an electronic device to use the power sent by one or more power cables respectively electrically coupled to the one or more power sockets to charge a battery or operate the electronic device.

9. The monitor riser of claim 8, wherein the one or more power sockets comprise four one or more power sockets.

10. The monitor riser of claim 8, wherein the top panel comprises a wireless charging station, the wireless charging station electrically coupled to the power conversion unit, the wireless charging station configured to enable the electronic device to use the power sent by the wireless charging station to charge the battery of the electronic device or operate the electronic device.

11. The monitor riser of claim 2, further comprising a first bracket and a second bracket, the first bracket and the second bracket, both, are configured to enable a bottom space to be formed opposite the internal space of the bottom panel, the first bracket is disposed at the first side panel and the second bracket is disposed at the second side panel.

12. The monitor riser of claim 1, wherein the first port comprises an audio-visual signal port and a control signal port and the second port comprises a USB-C port, the audio-visual signal port and the control signal port configured to enable a desktop computing device to be electrically coupled thereto via an audio-visual cable and a control cable, the USB-C port configured to enable a laptop computing device to be electrically coupled thereto via a USB-C cable.

13. The monitor riser of claim 5, wherein the keyboard, video and mouse switch further comprises a third port, the third port disposed at the back panel, the keyboard, video and mouse unit electrical coupled to the third port, and wherein the electrical command signal further comprises a third switching command signal, the keyboard, video and mouse unit configured to receive the third switching command signal from the human-machine interface unit and electrical couple a third computing device electrically coupled to the third port to the keyboard, the monitor, the mouse, and the one or more speakers.

14. The monitor riser of claim 13, wherein the third port comprises an HDMI port, the HDMI port configured to enable a gaming console or gaming computing device to be electrically coupled thereto via an HDMI cable.

15. The monitor riser of claim 13, wherein the keyboard, video and mouse unit is further configured to receive the third switching command signal from the human-machine interface unit and electrical couple the third computing device to the hard drive.

16. The monitor riser of claim 13, wherein the keyboard, video and mouse unit is further configured to receive the third switching command signal from the human-machine interface unit and electrical couple the third computing device to the headphone, the peripheral device, the router and the SD card.

17. The monitor riser of claim 1, wherein the input-output device interface unit comprises a keyboard port, a display port and a mouse port, the keyboard port, the display port and the mouse port are respectively disposed at the back panel, the keyboard, the monitor and the mouse are respectively electrically coupled to the input-output device interface unit via the keyboard port, the display port, and the mouse port.

* * * * *